Figure 5:
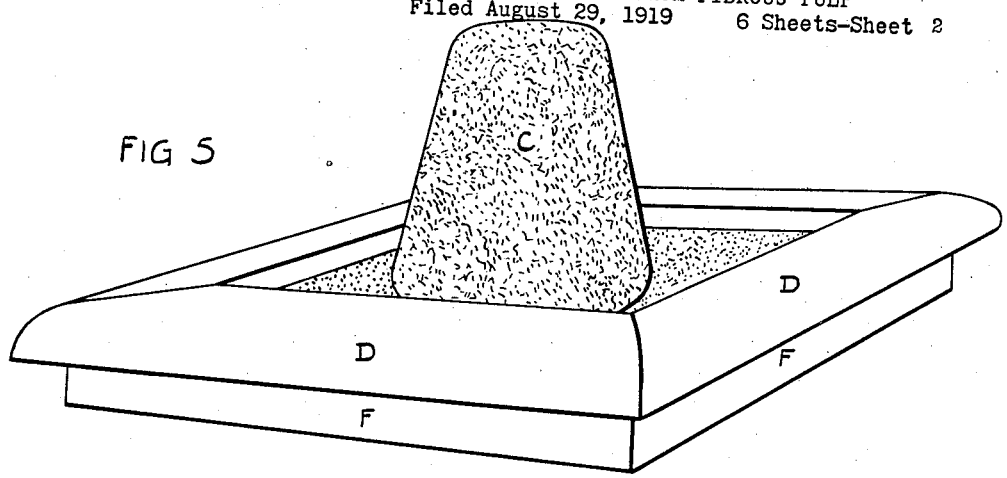

June 29, 1926.  
W. ROY  
1,590,956  
PROCESS OF AND APPARATUS FOR MOLDING SHAPED ARTICLES SUCH AS CONTAINERS  
FOR MILK, CREAM, JAM, AND THE LIKE FROM FIBROUS PULP  
Filed August 29, 1919 6 Sheets-Sheet 1
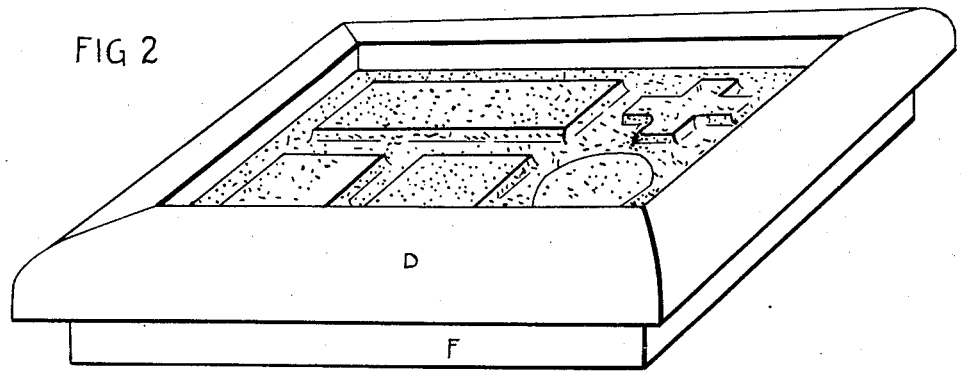
FIG 2
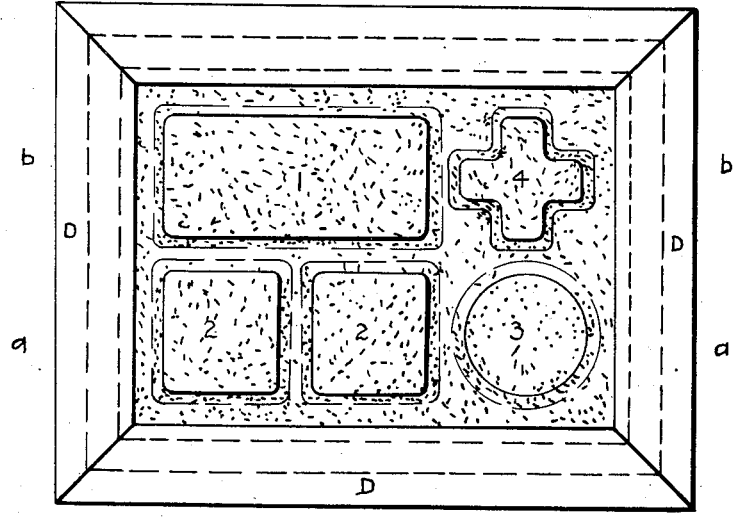
FIG 1.
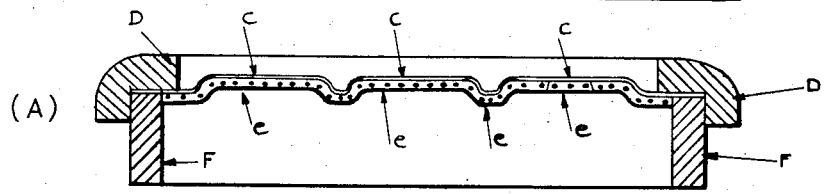
(A)
FIG 3
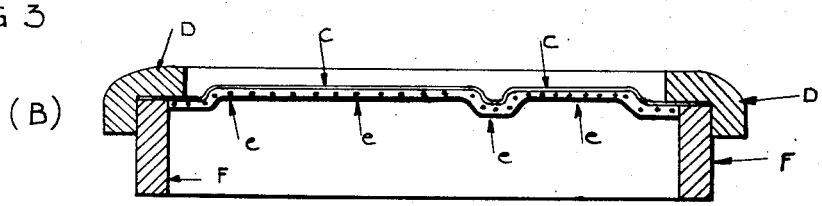
(B)

June 29, 1926.

W. ROY 1,590,956

PROCESS OF AND APPARATUS FOR MOLDING SHAPED ARTICLES SUCH AS CONTAINERS FOR MILK, CREAM, JAM, AND THE LIKE FROM FIBROUS PULP

Filed August 29, 1919

6 Sheets-Sheet 2

June 29, 1926.  
W. ROY  
1,590,956  
PROCESS OF AND APPARATUS FOR MOLDING SHAPED ARTICLES SUCH AS CONTAINERS
FOR MILK, CREAM, JAM, AND THE LIKE FROM FIBROUS PULP  
Filed August 29, 1919  
6 Sheets-Sheet 3
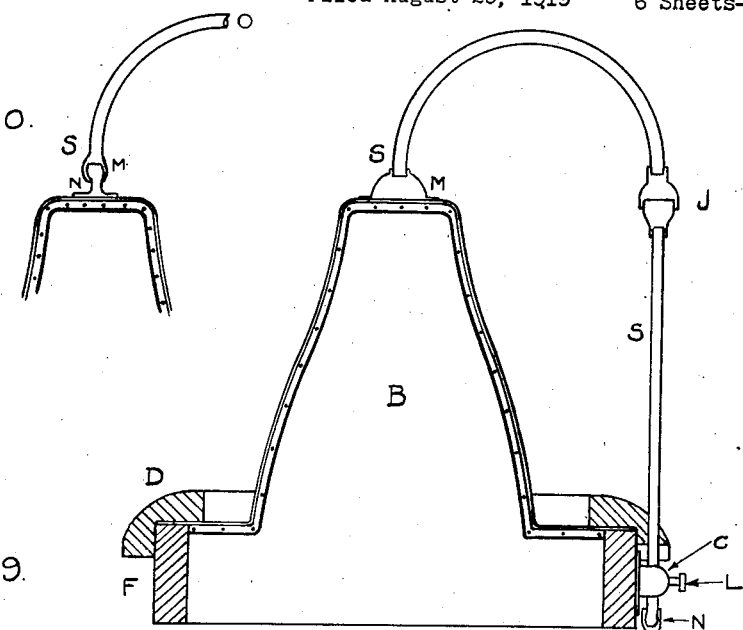
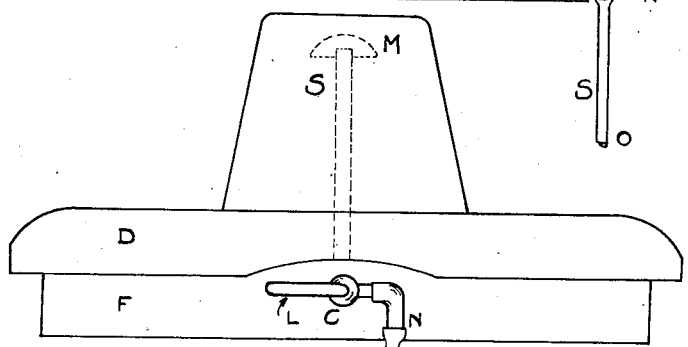
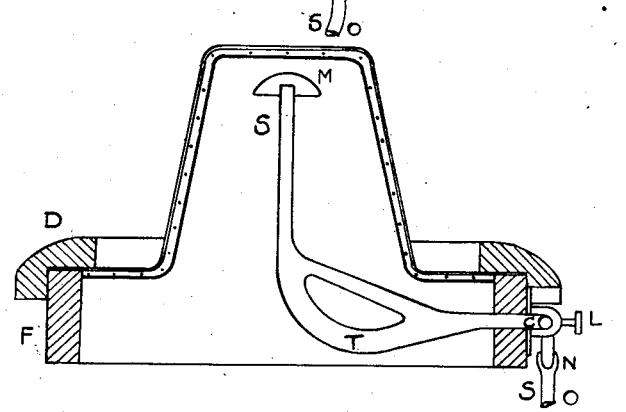

June 29, 1926.
W. ROY
1,590,956
PROCESS OF AND APPARATUS FOR MOLDING SHAPED ARTICLES SUCH AS CONTAINERS
FOR MILK, CREAM, JAM, AND THE LIKE FROM FIBROUS PULP
Filed August 29, 1919     6 Sheets-Sheet 4
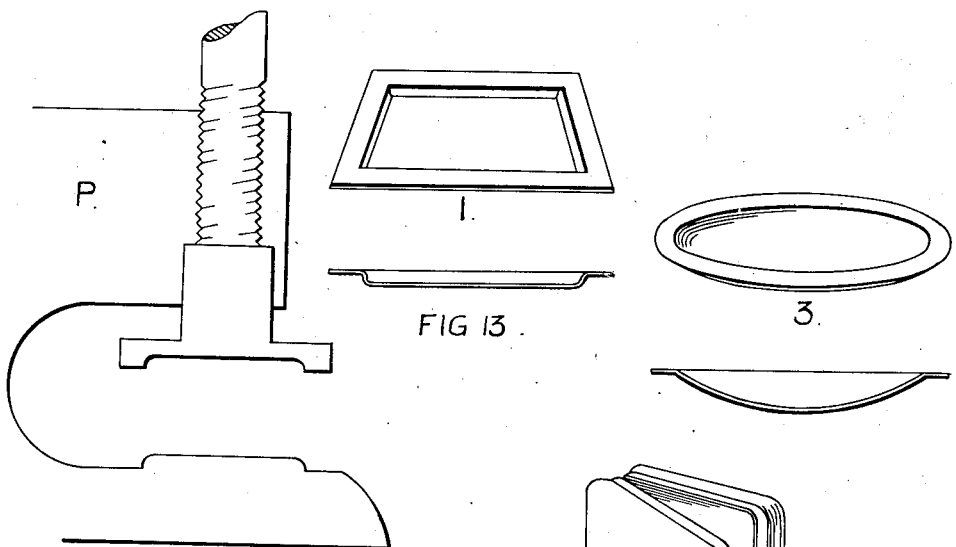
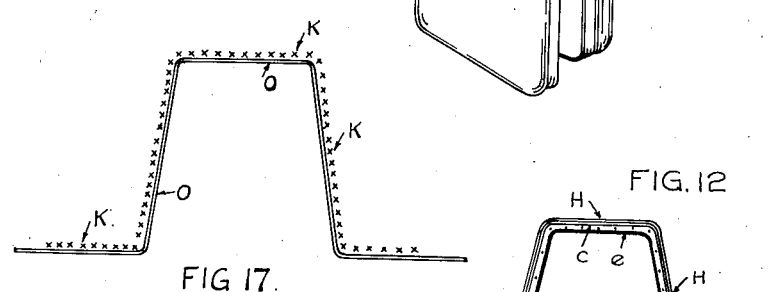
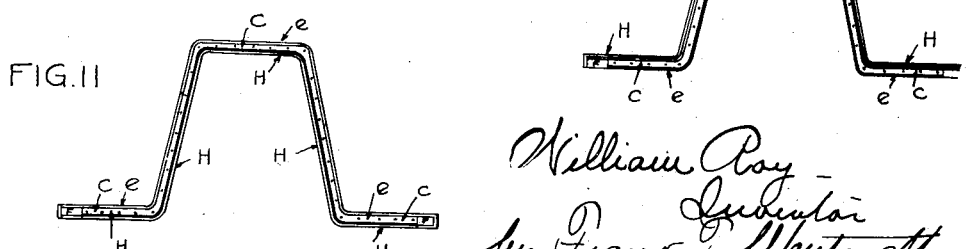

June 29, 1926.
W. ROY
1,590,956
PROCESS OF AND APPARATUS FOR MOLDING SHAPED ARTICLES SUCH AS CONTAINERS FOR MILK, CREAM, JAM, AND THE LIKE FROM FIBROUS PULP
Filed August 29, 1919  6 Sheets-Sheet 5
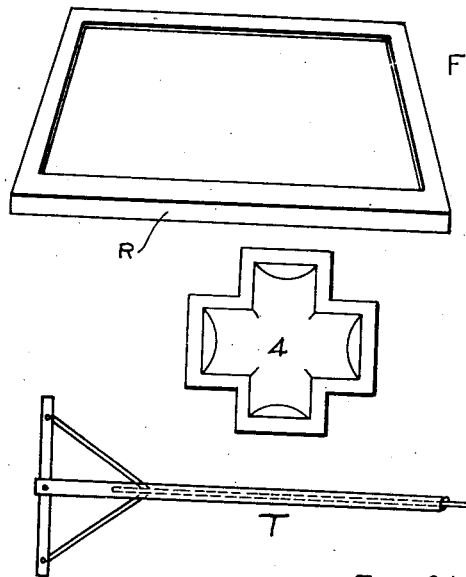
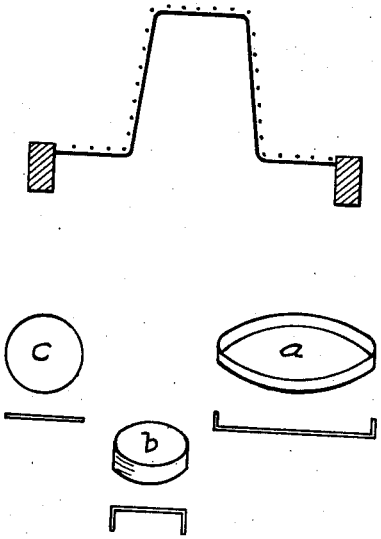
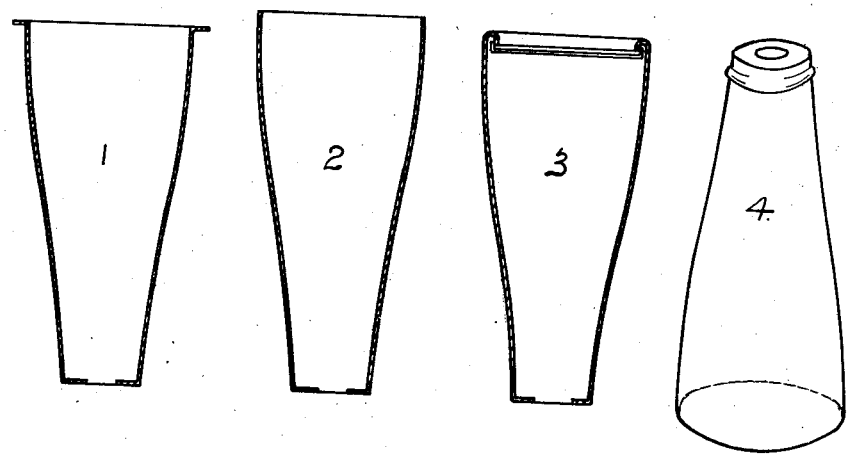
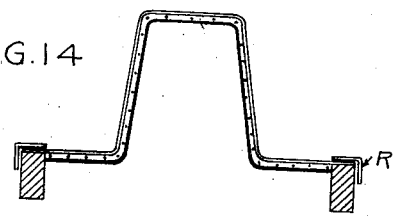

June 29, 1926.
W. ROY
1,590,956
PROCESS OF AND APPARATUS FOR MOLDING SHAPED ARTICLES SUCH AS CONTAINERS
FOR MILK, CREAM, JAM, AND THE LIKE FROM FIBROUS PULP
Filed August 29, 1919    6 Sheets-Sheet 6
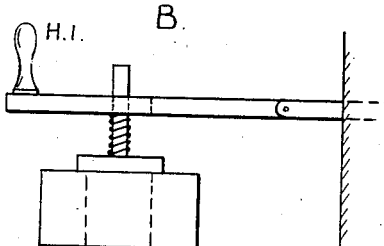
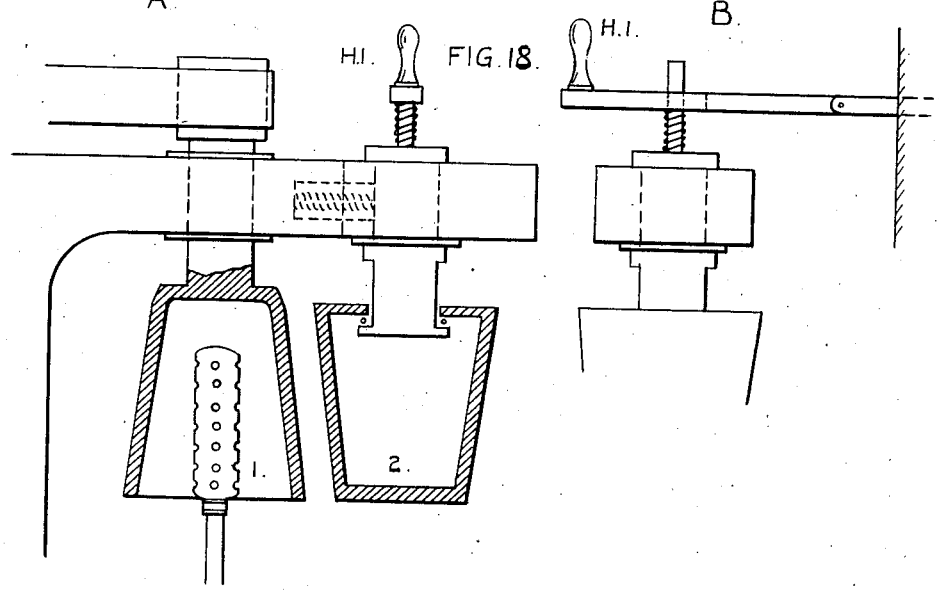
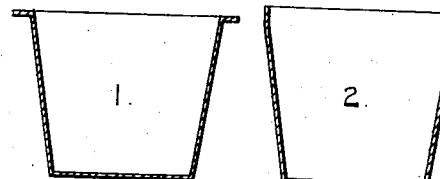
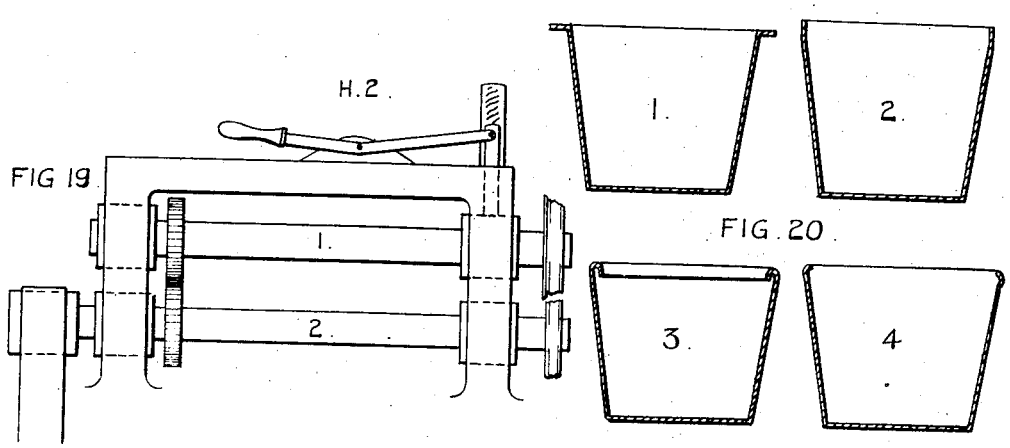
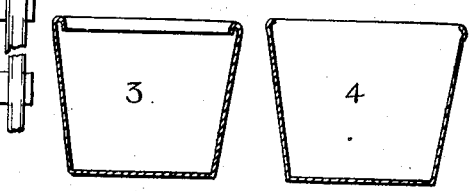

Patented June 29, 1926.

1,590,956

UNITED STATES PATENT OFFICE.

WILLIAM ROY, OF ADELPHI, LONDON, ENGLAND.

PROCESS OF AND APPARATUS FOR MOLDING SHAPED ARTICLES SUCH AS CONTAINERS FOR MILK, CREAM, JAM, AND THE LIKE FROM FIBROUS PULP.

Application filed August 29, 1919, Serial No. 320,657, and in Great Britain November 13, 1918.

(GRANTED UNDER THE PROVISIONS OF THE ACT OF MARCH 3, 1921, 41 STAT. L., 1313.)

This my invention consists in a process of and means for producing and making receptacles or other like articles of paper or paper felt (as hereinafter described) by hand, from liquid non-viscous fibrous pulp as used in the manufacture of hand made paper in a vat, by means of molds, in other forms than flat or plane sheets, and particularly in the production of an integral piece of hand-made paper, felt, or the like of the form of a hollow truncated cone, bottle shape, rectilinear, or other hollow raised shape, preferably tapering inwards towards the top, and having a flat flanged portion at the base. Furthermore each integral piece or sheet may have a series of such like shapes raised upon the base, provision being made to enable a plurality of shapes to be molded simultaneously.

The word "paper-felt" is used in this specification in the sense of the felting or matting effects upon the fibers of the fibrous pulp, resulting from the movements of the vatman's hands guiding the hand mold as hereinafter described.

The advantages of this my invention are that such receptacles are produced without side seams and those of cup shape are seamless, consequently the receptacles made by my process are aseptic and hygienic. Further as only the best papers are made by hand, the best materials being necessarily selected, carefully free of any dirt, the resulting superiority of this hand-made paper as a food container, in the essential qualities of purity, strength, and durability, is at once evident, in appearance and handling, when compared to a machine made paper. No mechanical device or machine can or will adapt itself to the changing conditions in my hand process, and perform similar and equal work.

The known primitive process of making paper, by hand, is carried out in the "handpaper mill" in a vat of prepared pulp, and by means of a hand-mold. This hand mold consists of a wooden frame, light and rigid, of a size of the required sheet of paper. Transverse wires passing through and over light wooden bars help to keep the frame taut, and form a support for the gauze wire, perforated metal, or other permeable material, that forms the top or face of the mold and covers its entire surface. Fitted to each mold is a removable frame light and rigid, called the deckle, having a rebated edge which accurately fits over the mold frame and forms a raised edge above the top or face of the permeable material, all the way round. The vatman or operator grasping the mold firmly between his extended arms dips it with a sloping motion into the moving pulp in the vat, which flowing over forms a regular stratum of pulp on the upper or permeable surface of the mold. As the mold is lifted out of the pulp the water begins to drain through the perforated surface, a partial vacuum generates and draws the stratum to the surface of the mold, and at or about this stage the vatman by a shaking and twisting motion given to the mold and its contents weaves and interlaces the fibers, and finally produces upon the surface of the mold between the edges of the upper frame, a sheet of paper. This wet film of paper produced now requires to be drained of surplus moisture and strengthened by sizing, and these two objects are attained by the employment of couching felts, these being pieces of woolen cloth of a size larger than the mold itself.

The wet film is transferred from the mold to a couching felt by turning the mold over downwards and is laid or couched upon the felt to which it readily adheres on contact. Another couching felt is placed over the film and the operation continues as regards transferring of laying paper and felt alternately until a certain number of felts are piled upon an equal number of wet films. A number of these alternate layers of felts and films are now taken together and passed through a tub of size and drained. After which the sheets of paper may be safely handled and removed from the couching felts and dried.

According to my improved process, paper, or paper felt is produced and made by hand as hereinbefore described but in other forms than flat sheets in such shapes as receptacles, containers and other articles, by means of hand molds as described above, of gauze wire, perforated metal, or other permeable material, of regular or irregular mesh, but having raised upon the surface a shape or series of shapes corresponding to that required to be formed of hand made paper, felt, or the like.

In order when necessary to regulate the partial vacuum naturally formed inside the hand mold which it should be understood is open at the bottom (as described) during the process, and the drainage flow interconnected with that effect, I provide a detachable tube or series of tubes at any convenient part or parts of the mold, (the optional point of connection does not alter my process and type of molds in any essential) by means of which suction may be applied to draw the particles of the liquid pulp in close and regular contact with the surface of the mold at a stage of the submersion subsequent to the upward lifting of the mold, to sustain the wet film in contact, or to aid or modify the skilled movements given by the operator's hands that weave and interlace the fibers. The hands being engaged in operating the mold, a bellows, pump or such like appliance operated by foot, is employed to actuate the suction. This auxiliary suction arrangement, comprises a fitment in the form of a lever-cock, attached to preferably the right hand side of the mold. The lever may be readily moved by the finger to open or close the suction. A nozzle is provided on the cock, at a convenient distance whereby the mouth of the suction tube from the pump may be readily slipped on or off by the finger and thumb of the right hand, extension of the suction tube to the permeable material being illustrated hereinafter.

The liquid pulp may be applied to the surface of the mold by dipping in the vat as described in the ordinary hand mold, or alternatively this object may be attained by dipping the base and spraying or pouring over the liquid pulp to the outer surface of the mold all other conditions being the same, my process being proceeded with as already and hereinafter described.

The wet film of paper is now transferred to the felt for the purposes of further draining and sizing, but as I am not producing a flat sheet but an integral sheet with a required shape or series of shapes raised upon its surface, the felts must correspond to those shapes. I therefore employ a felt or felts molded out of or woven to the required shape or shapes, to form a casing or cover for each shape. These felt casings are stretched upon and evenly attached to a correspondingly shaped wire frame of a size approximately equal to my hand mold. The wet film of paper of raised shape is couched on and within this specially formed felted frame and, on contact, will readily adhere to the same and allow the hand mold to be removed. The operation of sizing follows that of transferring, and in order that in my process these operations may be continuous for convenience of time and method, I suspend the felted frame at a suitable distance above the hand mold, set the suction tube when that is being used at the top of mold through the felt, or at another suitable part of the mold and proceed to form the layer of paper; thereafter release the suction, convey the hand mold with the contained wet film of paper, and the felt in position, to the sizing tub. After sizing and partly drying, the wet film has been thereby rendered suitable for handling as a formed shape of paper of one integral piece. The molded shape or shapes are trimmed or separated from the entire piece so as to leave a flanged portion on the base of each.

In the further operations of surfacing and the like preparatory to their complete finishing and with the object of their utilization as containers and the like for example, I have produced by this process a number of shaped articles as illustrated. The shapes which are in the form of a tray or filter (hereinafter described) are surfaced in the ordinary embossing press between metal surfacing molds of the same shape as the molded articles. The shapes in the forms of cups, bottles and the like are surfaced between rollers and the edges of the top or bottom turned over and seamed by means of a machine similar to that known in the sheet metal trade. In the case of the bottle shape a formed disc of paper is joined to form the bottom and to enable this operation to be done more readily an "adapter" (as hereinafter described) is used, that expands to the size required when placed inside the shape. The machines for these finishing operations and the shapes in stages of completion are shown in the accompanying drawings.

To render these articles waterproof and airproof they may be dipped in hot wax or other suitable proofing material for use as containers of liquid such as milk.

In cases where additional strength or durability is desired the gauze wire or other permeable material used as formers of these hand made paper, felt or the like shapes, may remain permanently in contact with the substances and be dealt with as one combined material of paper, felt, or the like reinforced with the permeable mold or former.

The mold as hereinbefore described when used to produce reinforced shapes is modified to the extent of the permeable material being unattached to the mold and kept in position by means of a movable metal frame underneath the deckle, as illustrated in the accompanying drawings.

In order that my said invention may be understood, I append hereunto as examples, six sheets of drawings:—

Fig. 1, Sheet 1, is a plan of the hand-mold showing the movable frame or deckle D and by dotted lines the underlying mold frame, also a series of raised shapes upon the permeable material or face of the mold, Nos. 1, 2, 3, 4. Fig. 2 is a view in perspective of the same mold showing the deckle D, and portion of the side of the mold frame F. Fig. 3ᴬ is a cross section of the mold as Fig. 1, at $a, a$, and B a cross section at $b, b$. The deckle is shown at D and the mold frame at F. The permeable face is indicated at $c$ and the cross wires supporting the mold face at $e$.

Figure 4:
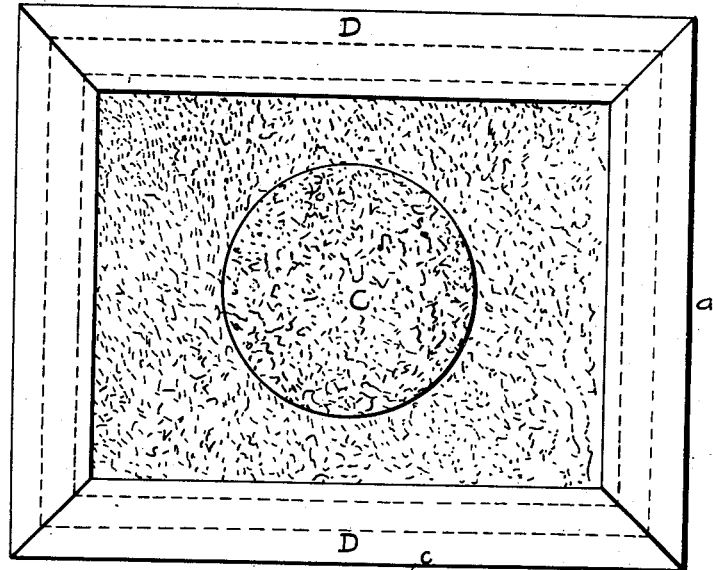
Figure 6:
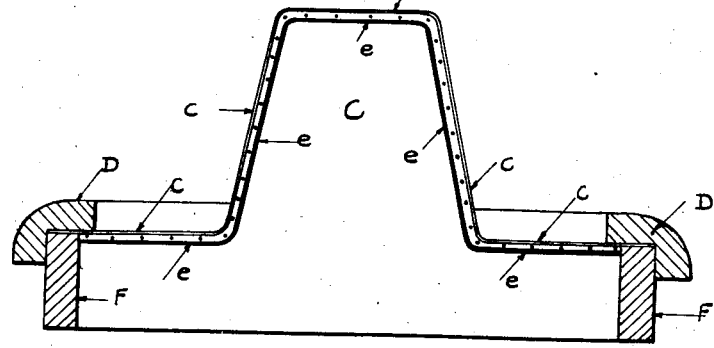

Fig. 4 Sheet 2 is a plan of the hand mold showing the deckle D and indicating the mold frame by the dotted lines. The permeable face is formed into one raised shape, represented at C. Fig. 5 is a view in perspective of the same mold showing the deckle D, and a portion of the side of the mold frame F. Fig. 6 is a cross section of the mold as in Fig. 4 at $a, a$. The deckle is shown at D and frame at F. The permeable face is indicated at $c$ and the cross wires supporting the mold face at $e$.

Fig. 7, Sheet 3 is an elevation of the mold aforementioned, showing the suction attachment applied internally, S is the suction tube, M its mouth. The lever and cock are represented at L and C, N is the nozzle, on which the suction tube is attached and O is the suction tube from suction pump (not shown). Fig. 8 is a cross section of the hand mold as in Fig. 7 showing the suction attachment S in cross section. M is the mouth, T a trap for water leakage, L the lever, C the cock, N the nozzle, and O the suction tube from suction pump. Fig. 9 is a cross section of the same hand mold, but with a raised shape in the form of a bottle B. This figure shows the suction tube S applied externally. M is the mouth in the form of a hollow cap of soft rubber. The suction tube is jointed at J, and the portion of tubing extending in a curve from J is flexible and may be moved in any direction. Fig. 10 shows an alternative method of attaching the suction tube mouth M, over a fixed nozzle N.

Fig. 11 Sheet 4 represents a cross section of a similar mold to Fig. 6 without the deckle or frame, the face of permeable material and its supporting wires being attached to a metal frame F, and the interior surface being wholly covered with felt indicated at H. The gauze wire is shown at $c$ and the supporting wires at $e$. This figure represents the felted frame. Fig. 12 is a similar felted frame having the felt upon the outside surface as at H. These felted frames as shown in Figs. 11 and 12 are for couching the deposited films in or upon the surfaces shown.

Fig. 13 Sheets 4 and 6. The numbered objects viz: 1, 2, 3, 4 correspond to the same numbers as indicated on Fig. 1 Sheet 1, and represent the finished articles in the forms respectively of a tray 1, a double or folding tray 2 which has been formed by cutting away the flange of the article molded as shown at 2, 2 Fig. 1 except the portion thereof between the two tray-like shapes which is left to form a hinge. A filter is shown at 3, the articles 1 to 3 being for laboratory use for drying and filtering, and a cross in relief 4, being an association of ideas with the work. P represents a usual form of press for embossing and used with this process for surfacing and finishing the shaped articles. Fig. 14 is a cross section of a hand mold as in Fig. 6 Sheet 2 showing a cross section of the aforesaid removable metal frame R and a detachable permeable material. Fig. 15 is a view in perspective of the removable metal frame R used as described in the process of producing reinforced shaped articles. Fig. 16 represents the mold as at Fig. 14 without the removable metal frame and after the deposited film and permeable material together are removed. Fig. 17 is a cross section of the permeable material and deposited film combined and separated from the mold frame. O is the permeable material and K the deposited film of fibrous material.

Fig. 18 Sheet 5 represents at A two hollow rollers for compressing and surfacing the molded shapes. Roller No. 1 the driver is fixed and is revolved by a belt or gearing and is gas heated internally. Roller No. 2 corresponds in shape to No. 1 without the bevelled part and is mounted in the frame, so as to be movable up or down and laterally in a well known manner as exemplified in a radial drill independently of No. 1 that revolves it by contact. The spindle carrying roller No. 2 unlike that of the drill does not revolve. The cup shape as example No. 1 Fig. 20 is placed on roller No. 2 by hand or automatically. The handle H¹ by which the roller 2 is operated is slid forward for contact and compression, the roller is next eased off slightly and by pressing the handle downwards the flanged portion is flattened. The flange is brought parallel with the axis by a final movement at foot of the rollers. The shape then released will appear at No. 2, Fig. 20.

Fig. 19 Sheet 5 are two mandrels Nos. 1 and 2 set up parallel one above the other and between two frames one at either end and within which they revolve and are geared together preferably at the left hand end, the lower spindle or mandrel being driven by a belt. These geared twin spindles are provided on their right hand ends with removable dies or formers male and female and in order that the shapes may be readily placed between these dies or removed, the upper spindle is arranged so that it may be moved upwards at the right hand end by a lever H², provided with a spring to throw the spindle back to its parallel position with respect to the other spindle, on releasing the lever. The cup shape 2 Fig. 20 is placed between these dies for the purpose of turning in the flanged portion as in example 3, and again in another set of dies to finish the edge or rim of the cup shape as example 4 Fig. 20 in which the turned over part has been compressed so as to make the seam practically imperceptible.

Referring to Fig. 21 sheet 6 the bottle shapes Nos. 1, 2, 3, 4 are treated between a set of rollers as Fig. 18 of a shape to suit their form, the process being the same excepting that a flanged disc of paper is added at the stage of example No. 2 and the disc *a* placed inside the shape before turning over the edge, and the two edges or flanges placed between the dies, and turned over together to form the joint as in example 3 and further to finish as example 4 a flanged cap *b* or disc of paper *c* is provided to cover the mouth or opening for attachment by a suitable cement.

To hold the flanged disc *a* to form the bottom of the bottle shape in position between the dies to produce example 3, an adapter comprising any known device such as a pair of arms connected by links to a sliding central rod inside a tube, as shown at T, is provided for use within the shape during the operation and this is held by the hand, or carried in a movable carriage, in alignment with faces of the dies.

Claims:

1. The herein described process of making shaped articles consisting in applying non-viscous fibrous pulp exteriorly of a recessed hollow form premeable by the liquid of the pulp and having an open bottom, until the pulp reaches and barely covers the top portion of the form laying the fibers thereof by a hand agitation of the mold while gradually raising the mold from a bath of said pulp, whereby subatmospheric pressure is developed within the portions of the mold projecting from the pulp, and the area of the form subjected to said pressure is progressively increased, and transferring the article from the mold to an absorbent form adapted to receive same and conforming in contour to the mold.

2. The herein described process of making shaped articles consisting in applying non-viscous fibrous pulp exteriorly of a form permeable by the liquid of the pulp, and having an open bottom, until the pulp reaches and barely covers the top portion of the form, developing a suction within a progressively increasing portion of said mold, laying the fibers thereof by a hand agitation of the mold, and transferring the article from the mold to an absorbent form adapted to receive same and conforming in contour to the mold.

3. The herein described process of making shaped articles consisting in dipping the open base of a recessed mold having an open bottom and a surface permeable by the liquid contained in paper pulp in a vat containing such pulp, spraying or pouring pulp over said mold, until the pulp reaches and barely covers the top portion of the mold laying the fibers of the pulp upon said mold by a hand agitation thereof, gradually raising said mold from the mass of pulp during such agitation, whereby subatmospheric pressure will be developed within the mold and will be progressively extended to increasing areas thereof, and transferring the article from the mold to an absorbent form adapted to receive same and conforming in contour to the mold.

4. An apparatus for use in the manufacture of formed paper articles consisting in a movable hand mold having an open bottom comprising a rigid wire frame supporting permeable material conforming to the shape of the article to be made and having a movable upper frame.

5. In an apparatus for forming shaped paper articles, the combination with a recessed hollow form mold having a surface permeable to the liquid of the pulp and an open bottom, of a felt lined similarly and inversely shaped frame adapted to receive the article from said mold.

6. An apparatus for use in the manufacture of formed paper articles consisting in a movable hand mold having an open bottom comprising a rigid wire frame supporting permeable material conforming to the shape of the article to be made and having a movable upper frame, said permeable material being separably connected to said frame, whereby it may be retained in the article to reinforce same.

WILLIAM ROY.